(No Model.)
A. STEINKE.
PROCESS OF AND APPARATUS FOR THE TREATMENT OF HOPS IN THE MANUFACTURE OF MALT LIQUORS.
No. 297,467. Patented Apr. 22, 1884.
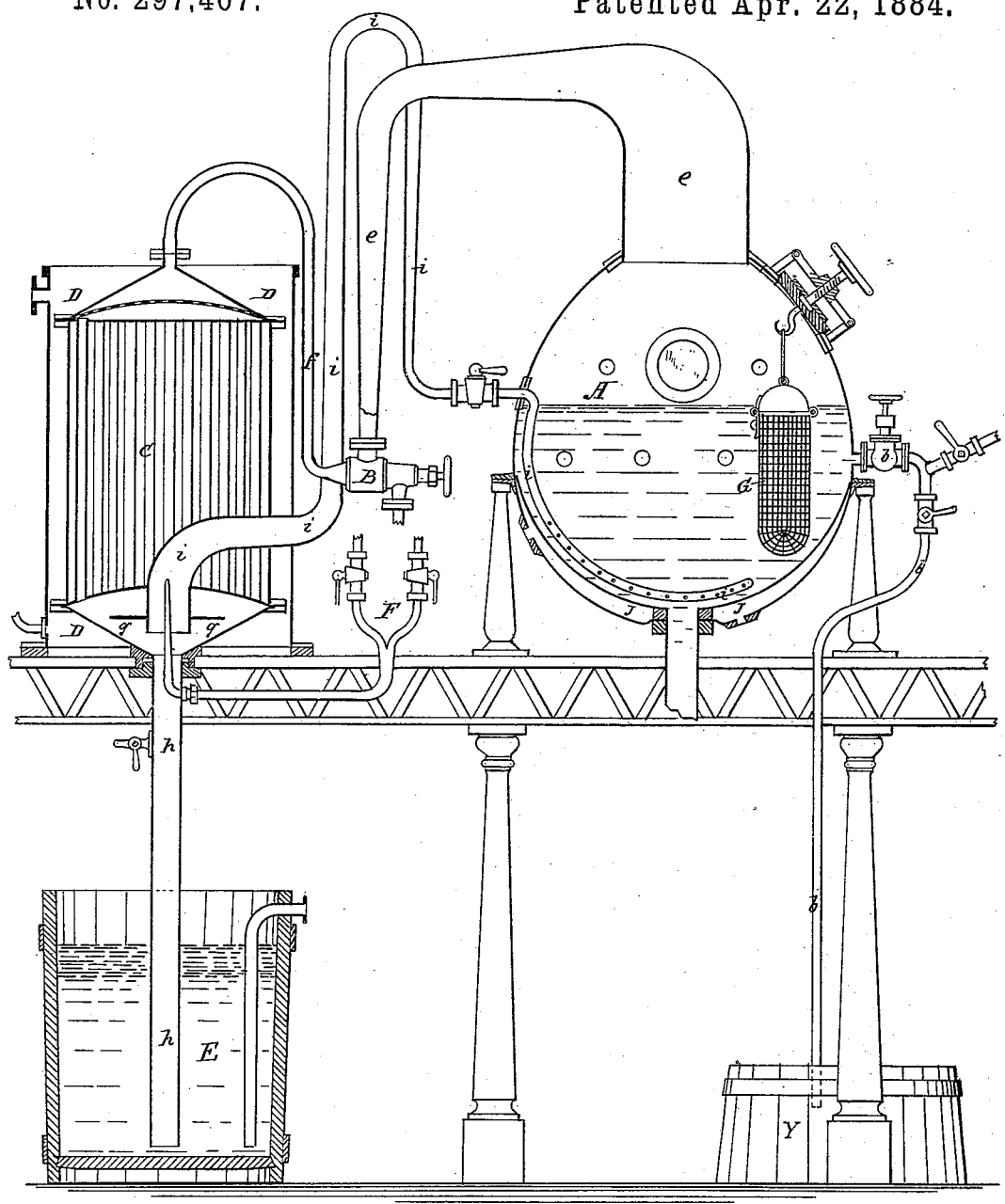
WITNESSES:
INVENTOR
Alexander Steinke,
BY James L. Norris
ATTORNEY

UNITED STATES PATENT OFFICE.

ALEXANDER STEINKE, OF NEW YORK, N. Y.

PROCESS OF AND APPARATUS FOR THE TREATMENT OF HOPS IN THE MANUFACTURE OF MALT LIQUORS.

SPECIFICATION forming part of Letters Patent No. 297,467, dated April 22, 1884.

Application filed September 29, 1883. (No model.)

*To all whom it may concern:*

Be it known that I, ALEXANDER STEINKE, a native of Germany, having declared my intention to become a citizen of the United States, residing at New York, in the county and State of New York, have invented new and useful Improvements in the Process of and Apparatus for the Treatment of Hops in the Manufacture of Malt Liquors, of which the following is a specification.

The object of my invention is to provide a process of and means for the most perfect utilization of hops in the manufacture of malt liquors for preventing the loss of the aromatic and volatile or light parts, and also for removing from the liquors all obnoxious, oily, and heavy parts, which escape with the vapors during the boiling operation, thus producing a pure and wholesome beverage. I accomplish these objects by boiling the worts and hops in a vacuum-pan and returning the aromatic and volatile or light parts into the liquid in the pan.

The apparatus for carrying out my process is shown in the annexed drawing, representing a longitudinal vertical section, and in which—

A represents a vacuum-pan of ordinary construction; B, a steam-ejector; C, a condenser; D, a water-tank containing the condenser; E, a tank into which the products of condensation are discharged; F, pipe for injecting steam or gas; G, vessel of wire-gauze suspended within the vacuum-pan; J, steam-space beneath the pan; $b$, pipe for supplying the pan with liquid from a tank, $y$, or from any other source; $e$, pipe connecting the pan A with the ejector B; $f$, pipe leading from the ejector to the condenser; $g$, space beneath the condenser; $h$, barometric column; $i$, pipe leading from $g$ into the pan A. That part of $i$ which passes down into the liquid in the pan is perforated and closed at its end.

The operation of the apparatus is as follows: The vacuum-pan A are filled with worts to about five-sixths of its capacity. Hops contained within the crate G are suspended in the liquid, which are boiled and partly evaporated by steam admitted into the space J beneath the pan. The vapors generated in the pan pass through the pipe $e$, ejector B, and pipe $f$ to the condenser C, which consists of a series of vertical tubes surrounded by water, the water being admitted to the tank near its bottom, and passing off near its top. In the tubes C the vapors are to the greater part condensed. The condensed part containing the obnoxious, heavy, and oily products passes through the space $g$ and along its walls into the barometric column $h$, and thence into the tank E, which is placed at the proper level beneath the condenser. The tank E is filled with water to about five-sixths of its height, the overflow rising from near the bottom, so that the oily matter will float on the surface of the water, and may be dipped or drawn off from time to time. In place of the barometric column a pump may be used. The aromatic, volatile, or light parts escaping from the pan, after reaching the space $g$ beneath the condenser pass into and through the pipe $i$, by which they are returned into the boiling liquid. This return of the volatile matters is caused by the suction of the ejector B, the apparatus being so regulated that the pressure beneath the condenser is in excess of the pressure in the pan. The circulation through the pipe $i$ may, however, also be forced by injecting steam through the pipe F. When desired, this same pipe F may be used for introducing atmospheric air, carbonic acid, or other gases or vapors. When the liquid is boiled down to the proper strength for drawing off it retains all the useful parts which are lost by the ordinary processes of boiling.

I am aware that malt extract and hops have been boiled together in a vacuum-pan, and I lay no claim thereto.

I do not claim the treating of worts by the vacuum process; nor do I broadly claim the vacuum apparatus.

What I do claim, and desire to secure by Letters Patent, is—

1. The within-described process of treating hops, consisting in boiling the same in the presence of worts in a vacuum-pan, condensing from the vapors evolved therefrom the heavy oils, and returning the lighter aromatic vapors separated from the heavier oils to the vacuum-pan, substantially as described.

2. The combination, with a vacuum-pan, an ejector, and a condenser, of a pipe leading from the space beneath the condenser into the liquid in the pan, substantially as and for the purpose specified.

3. The combination, with a vacuum-pan, an ejector, and a condenser, of a pipe, $i$, leading from the space beneath the condenser into the liquid within the pan, and means for injecting steam or gas into the pipe $i$, substantially as and for the purpose specified.

In testimony whereof I have hereunto set my hand in the presence of two subscribing witnesses.

ALEXANDER STEINKE.

Witnesses:
F. BILLICH,
WM. R. KEESE.